United States Patent
Kurtz et al.

(10) Patent No.: US 10,081,318 B2
(45) Date of Patent: Sep. 25, 2018

(54) METHOD AND APPARATUS FOR OPERATING A MOTOR VEHICLE

(71) Applicant: Bayerische Motoren Werke Aktiengesellschaft, Munich (DE)

(72) Inventors: Stefan Kurtz, Taufkirchen (DE); Alfons Brunner, Woerth a. d. Isar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 512 days.

(21) Appl. No.: 14/696,790

(22) Filed: Apr. 27, 2015

(65) Prior Publication Data
US 2015/0307042 A1    Oct. 29, 2015

(30) Foreign Application Priority Data

Apr. 25, 2014  (DE) .................. 10 2014 207 810

(51) Int. Cl.
*B60L 1/00* (2006.01)
*B60R 16/03* (2006.01)
*B60R 25/10* (2013.01)

(52) U.S. Cl.
CPC .......... *B60R 16/03* (2013.01); *B60R 25/1004* (2013.01)

(58) Field of Classification Search
CPC ............................. B60R 16/03; B60R 25/1004
USPC ........... 307/9.1, 10.1, 10.2, 10.3, 10.4, 10.5, 307/10.6, 10.7, 10.8
See application file for complete search history.

(56) References Cited

U.S. PATENT DOCUMENTS

| | | | |
|---|---|---|---|
| 2004/0239186 A1* | 12/2004 | Emmerling | B60R 25/045 307/10.1 |
| 2006/0017584 A1* | 1/2006 | Yanagida | B60R 25/1004 340/652 |
| 2013/0318607 A1 | 11/2013 | Reed et al. | |

FOREIGN PATENT DOCUMENTS

DE         103 23 504 B4       9/2005

OTHER PUBLICATIONS

German Search Report dated Mar. 30, 2015 with partial English-language translation (thirteen (13) pages).

* cited by examiner

*Primary Examiner* — Thomas Skibinski
(74) *Attorney, Agent, or Firm* — Crowell & Moring LLP

(57) ABSTRACT

A method for operating a motor vehicle includes receiving measurement signals which include information relating to a temporal current and/or volt profile of an electronic control unit of the motor vehicle. The method also provides vehicle information which includes information relating to a desired state of the electronic control unit. The method also determines a discrepancy between the received measurement signals and the vehicle information provided. If the discrepancy determined is greater than a predefined tolerance value, a manipulated state of the electronic control unit is determined as part of the method.

8 Claims, 5 Drawing Sheets

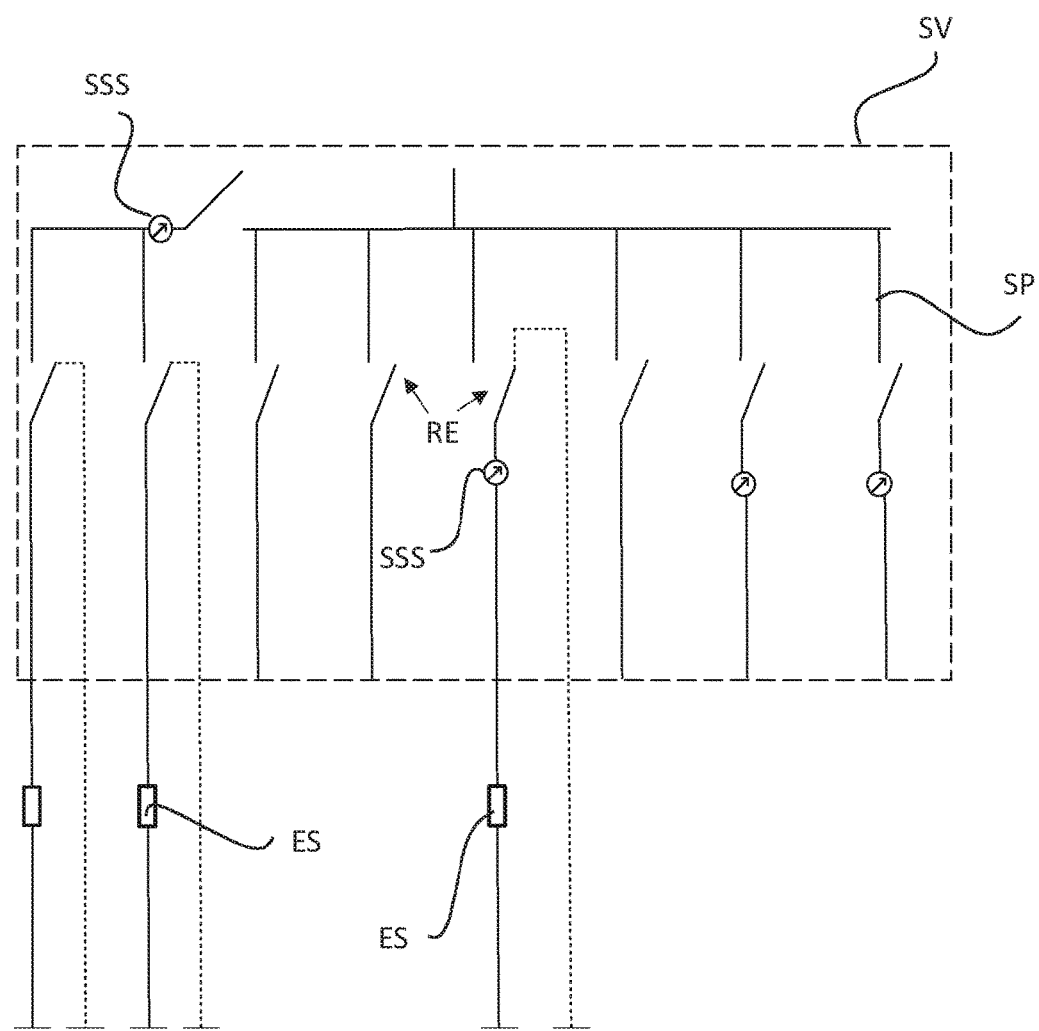

METHOD AND APPARATUS FOR OPERATING A MOTOR VEHICLE

CROSS REFERENCE TO RELATED APPLICATION

This application claims priority under 35 U.S.C. § 119 from German Patent Application No. 10 2014 207 810.5, filed Apr. 25, 2014, the entire disclosure of which is herein expressly incorporated by reference.

BACKGROUND AND SUMMARY OF THE INVENTION

The present invention relates to a method and an apparatus for operating a motor vehicle, which method or apparatus is suitable for increasing the security of the motor vehicle.

A problem exists in the theft of motor vehicles. In order to prevent such theft or at least make it more difficult, anti-theft systems are known and are also at least recommended or even prescribed by auto insurance companies for motor vehicles. If an electronic immobilizer, for example, has been set up in the motor vehicle, it prevents the engine from being started without the corresponding electronic key. Another possible way of preventing unauthorized starting of the motor vehicle is to implement departure codes in a corresponding control unit of the motor vehicle. These departure codes are known, at best, to only authorized persons, with the result that it is impossible for unauthorized third parties to change the motor vehicle to a driving mode. In addition, various anti-theft systems are known which indicate malicious opening of the motor vehicle by way of acoustic or visual alarm signals, for example.

Since motor vehicles are nowadays increasingly being equipped with communication interfaces, further points of attack arise for unauthorized intrusion or unauthorized use by third parties. Examples of accordingly suitable communication technologies are WLAN, Ethernet, NFC, Car-to-X and Bluetooth, which are nowadays implemented in the vehicle system of a motor vehicle. In this context, WLAN is an abbreviation for the English expression Wireless Local Area Network and denotes a local radio network, in particular according to a standard in the IEEE 802.11 family. Ethernet denotes a local wired network, which makes it possible to interchange data between devices connected to the local network to the largest possible extent, according to the IEEE 802.3 standard. The acronym NFC is an abbreviation for the English expression Near Field Communication and is an international transmission standard for contactlessly interchanging data by radio technology over short distances and is usually carried out according to either of the standards ISO 14443 and ISO 15693. The expression Car-to-X is a comprehensive designation for communication paths between a motor vehicle and an information source, which information source is abbreviated using the placeholder X. In this context, examples are Car-to-Car and Car-to-Infrastructure communications which describe the interchange of data between motor vehicles and between a motor vehicle and the traffic infrastructure. In this case, it is possible to use different communication technologies, for example a technology in the IEEE 802.11 family. Bluetooth is another technology which makes it possible to transfer data between devices over short distances by radio technology. In this context, the data are transmitted according to the industry standard IEEE 802.15.1. A vehicle may also communicate wirelessly with devices outside the vehicle via a mobile radio interface, for example according to one of the standards GSM, GSM2, GSM3 or GSM4 (LTE). A communication connection may also be effected using a plurality of said technologies and/or via the Internet.

These types of communication make it possible, inter alia, to intervene in the vehicle system without necessarily having to have physical access to the motor vehicle. Internet connections even make it possible for unauthorized third parties to intervene in a manner independent of the location. On account of these risks of attack, further protection of the motor vehicle is necessary in order to prevent intervention by unauthorized third parties or at least to make such intervention more difficult.

An object is to provide a method and an apparatus, which method or apparatus is suitable for increasing the security of the motor vehicle in order to therefore render intrusion and use by unauthorized persons, for example, more difficult.

According to a first aspect of the invention, a method for operating a motor vehicle includes a plurality of steps. In this case, provision is made for measurement signals which comprise information relating to a temporal current and/or voltage profile of an electronic control unit of the motor vehicle to be received. The method also comprises providing vehicle information which includes information relating to a desired state which is representative of a characteristic current and/or voltage profile of the electronic control unit. As part of the method, a discrepancy between the received measurement signals and the vehicle information provided is determined in the further course. If the discrepancy determined is greater than a predefined tolerance value as part of this method, a manipulated state of the electronic control unit is determined.

In this manner or using the steps according to the invention, it is possible, for example, to determine unauthorized intrusion in the vehicle system or unauthorized use of the motor vehicle. In this context, the electronic control unit forms at least one component of the vehicle system and is set up, for example, to open doors or windows of the motor vehicle. Alternatively or additionally, the electronic control unit is designed to start an engine of the motor vehicle or to control further electronics in the motor vehicle. It is possibly a component of the vehicle system or controls all electronic operations inside the motor vehicle as a type of electronic control center.

In this context, use is made of the knowledge that an electronic component has a characteristic temporal current and/or voltage behavior in an authorized mode. This characteristic temporal current and/or voltage behavior of the electronic component acts as a type of fingerprint which can be used to identify the electronic component and to determine normal operation of this electronic component.

As part of the method, a temporal current and/or voltage profile of the electronic control unit of the motor vehicle is accordingly monitored by comparing the measured current and/or voltage profile of the electronic control unit with a stored characteristic current and/or voltage profile for this electronic control unit.

The vehicle information which is provided and includes at least the desired state of the electronic control unit is stored, for example, in a data memory which is associated with the electronic control unit, for example, and is arranged inside the motor vehicle or is arranged outside the motor vehicle, for example in a backend, and is possibly provided by the vehicle manufacturer.

The vehicle system, including its electronic control units, constitutes a known electronic system which is established at the time the motor vehicle is manufactured, with the result that the characteristic current and/or voltage profiles of the electronic control units installed in the motor vehicle are known.

If an electronic control unit is manipulated, whether physically or using the available communication interfaces, this results in a change in the temporal current and/or voltage profile, in particular during a starting operation of the control unit, which can be determined by a comparison with the known characteristic current and/or voltage profile. The temporal current and/or voltage profile of the electronic control unit is therefore used as a type of security identification parameter, which makes it possible to further improve theft protection of motor vehicles which is possibly already present.

In this context, it is necessary to predefine a tolerance value for the measured current and/or voltage profile so that a manipulated state of the electronic control unit is reliably determined. This tolerance value is justified, inter alia, by possible fluctuations of the measurement signal or by the measurement tolerances of the measuring devices which are always present. If the measured temporal current and/or voltage profile of the electronic control unit differs from the characteristic current and/or voltage profile including the predefined tolerance value, a manipulated state of the electronic control unit is reliably determined. Depending on the measuring system, including the measurement signal acquisition by the measuring devices and subsequent evaluation, tolerance values of 0.1% or 5% to be complied with are feasible, for example. In this context, it is pointed out that the tolerance values to be complied with are generally dependent on the available measuring technology and the component to be measured in the vehicle system of the motor vehicle, with the result that, for an electronic control unit with a low current requirement for example, a possibly larger tolerance value than for an electronic control unit with a higher current requirement is advantageous during a current and/or voltage measurement.

It is then possible in the further course to prevent theft of the motor vehicle, for example by providing control signals. These control signals are consequently generated when a manipulated state has been determined. Control signals are understood as meaning control signals in addition to those which are needed to control the vehicle system during operation of the motor vehicle. Refinements with respect to the provision of control signals are described below.

According to one refinement of the first aspect, the received measurement signals include information relating to an actual energy consumption of the electronic control unit. The vehicle information provided also includes information relating to a desired energy consumption of the electronic control unit.

The electronic control units in a motor vehicle are generally connected to a management unit or electronic control center of the motor vehicle which controls the electronics of the motor vehicle as a type of superordinate decision-making entity. For example, this also includes controlling a current source or a current distributor inside the motor vehicle, as a result of which the electronic control units are supplied with current. If a function managed by the electronic control unit is required, the electronic control unit is activated. This makes it possible to log the actual energy consumption of the electronic control unit and to compare it with the known desired energy consumption. If the actual energy consumption deviates from the desired energy consumption including any tolerances, a manipulated state of the electronic control unit is diagnosed.

According to another refinement of the first aspect, the method comprises outputting an information signal if a manipulated state of the electronic control unit has been determined.

This refinement is an example of the above-described additional control signals which therefore signal unauthorized intrusion in the vehicle system of the motor vehicle by way of an acoustic and/or optical signal, for example. Such signals are implemented, for example, by activating a horn of the motor vehicle and/or a lighting system. In addition, it is also possible to indicate the manipulated state of the electronic control unit by transmitting an item of information to the manufacturer and/or the owner of the motor vehicle. This is then reported, for example, in the form of an emergency call with the message "possible theft".

According to another refinement, the method comprises preventing a drive unit of the motor vehicle from being started if a manipulated state of the electronic control unit has been determined.

This prevents an unauthorized starting operation of the engine of the motor vehicle, for example by means of provided control signals, in order to thus counteract the theft of the motor vehicle. For example, a relay inside the vehicle system of the motor vehicle is opened, with the result that there is temporarily no connection between the engine and an energy supply of the motor vehicle.

According to another refinement of the first aspect, the method comprises outputting a deactivation signal for deactivating at least one departure code for the motor vehicle if a manipulated state of the electronic control unit has been determined.

This refinement prevents, for example, a starting operation of the engine of the motor vehicle, which is initiated by inputting departure codes. If a manipulated state has been determined, theft of the motor vehicle is prevented in this manner.

According to another refinement of the first aspect, the method comprises outputting a deactivation signal for deactivating an energy supply of the motor vehicle if a manipulated state of the electronic control unit has been determined.

In this context, the energy supply of the motor vehicle is deactivated in order to thus prevent unwanted opening of doors and/or windows, for example. This can be implemented, for example, by way of a relay inside the vehicle system, which relay, in a similar manner to that described above, is opened by the deactivation signal and therefore prevents a connection between the electronic control unit and the energy supply inside the motor vehicle.

According to another refinement of the first aspect, the method comprises outputting a deactivation signal for deactivating current paths inside the motor vehicle if a manipulated state of the electronic control unit has been determined.

This makes it possible to deliberately isolate and/or deactivate the manipulated electronic control unit, with the result that further electronic control units remain active. In addition, it is also possible to use the deactivation signal to deactivate individual electrical supply lines by means of a deliberate short circuit, with the result that operation of the electronic control unit is possible again only after maintenance, for example, and theft or unauthorized intrusion is therefore prevented.

According to another refinement of the first aspect, the method comprises outputting a switch-off signal for selectively switching off the electronic control unit of the motor vehicle if a manipulated state of the electronic control unit has been determined.

In addition, it is pointed out that the individual refinements can also be combined in any desired manner.

According to a second aspect of the invention, an apparatus for operating a motor vehicle is designed to carry out at least one of the methods described above.

According to one refinement of the second aspect, the apparatus for operating a motor vehicle comprises at least one current and/or voltage sensor which is coupled, by signaling, to an electronic control unit of the motor vehicle and whose measurement signal is representative of a temporal current and/or voltage profile of the electronic control unit. The apparatus also comprises a data memory which stores vehicle information which includes information relating to a characteristic current and/or voltage profile of the electronic control unit. The apparatus also includes a management unit which is coupled, by signaling, to the at least one current and/or voltage sensor and to the data memory and is designed to receive measurement signals from the at least one current and/or voltage sensor and the vehicle information stored in the data memory. The management unit determines a manipulated state of the vehicle system or of the electronic control unit of the motor vehicle on the basis of a discrepancy between the measurement signals and the vehicle information.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 is a schematic diagram of an exemplary embodiment of a current distributor.

DETAILED DESCRIPTION OF THE DRAWINGS

Figure 1:
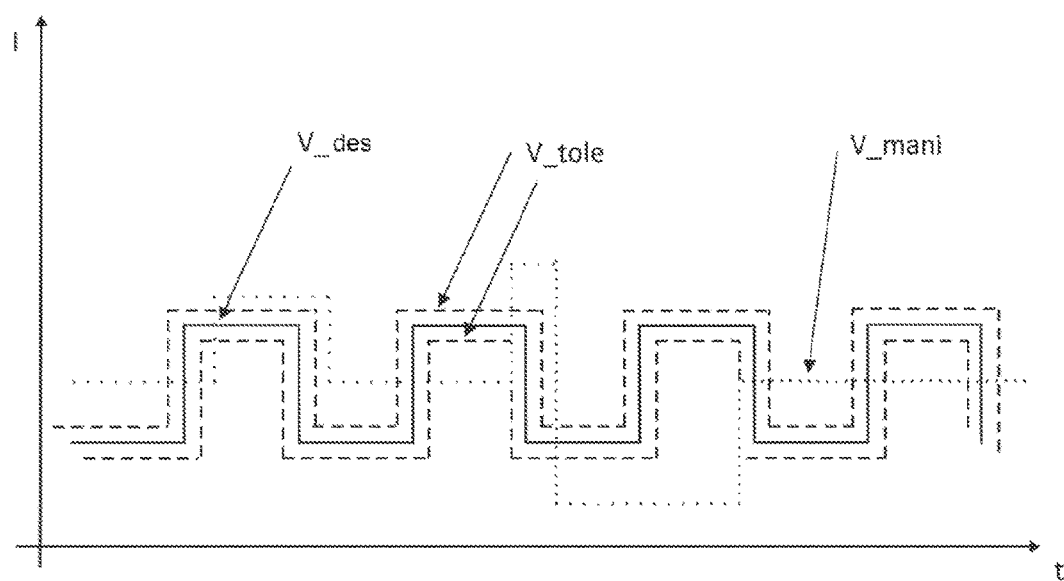
FIG. 1 is a graph of an exemplary embodiment of current profiles of an electronic control unit.
Figure 2:
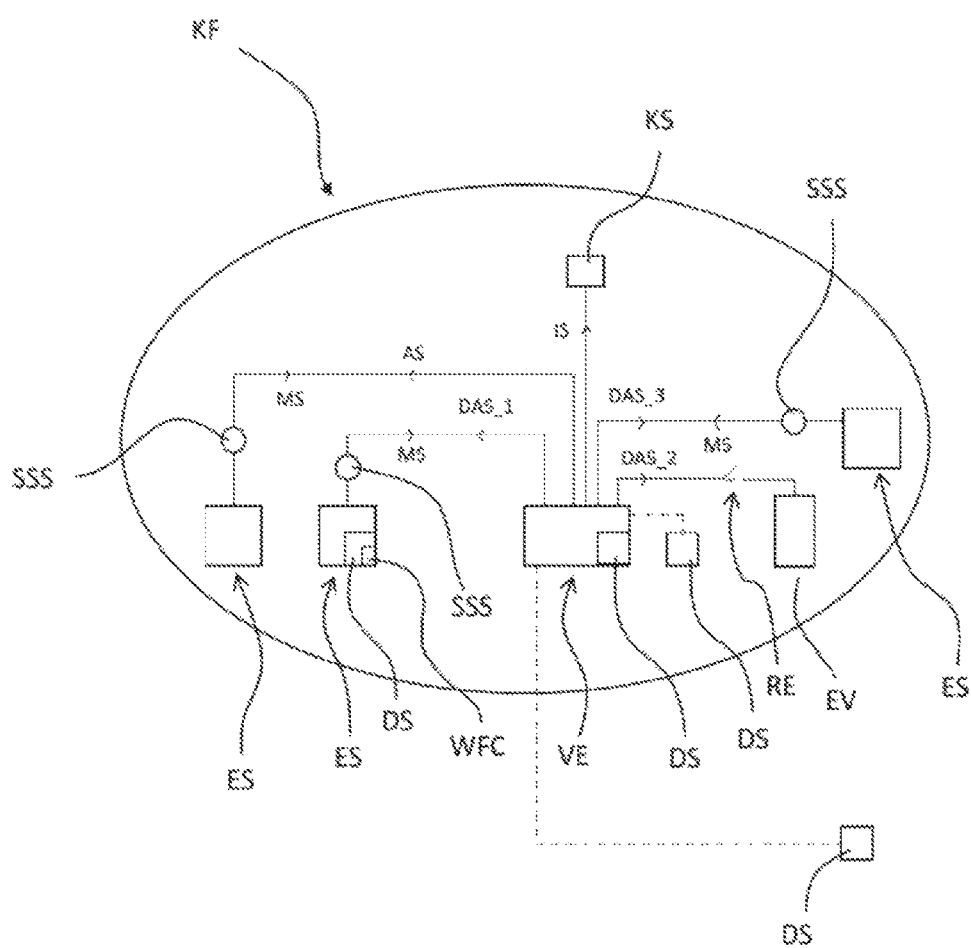
FIG. 2 is a schematic diagram of an exemplary embodiment of a motor vehicle having electronic control units.

FIG. 1 illustrates exemplary current profiles V_des, V_tole and V_mani of an electronic control unit ES of a motor vehicle KF (see FIG. 2). The respective currents I are depicted on the basis of the time t. A desired current profile V_des is illustrated using a solid line and shows a rectangular structure with periodic square-wave signals. For example, this represents periodic operation of the electronic control unit ES which is sometimes active and sometimes in a quiescent state. The desired current profile V_des is representative of a characteristic current profile of the electronic control unit ES and provides, inter alia, information relating to the function and a state of the electronic control unit ES of the motor vehicle KF. It acts as a type of fingerprint which makes it possible to identify the electronic control unit ES and to monitor its operation.

In this context, the electronic control unit ES forms at least one component of a vehicle system of the motor vehicle KF and is set up, for example, to open doors or windows of the motor vehicle. Alternatively or additionally, the electronic control unit ES is designed to start an engine of the motor vehicle KF or to control an energy supply EV in the motor vehicle KF. It is possibly a component of the vehicle system or controls all electronic operations inside the motor vehicle KF as a type of electronic control center, for example an on-board computer.

The desired current profile V_des of the electronic control unit ES is known at the time of manufacture of the vehicle system of the motor vehicle KF and is stored in a data memory DS, for example together with further vehicle information. The data memory DS is associated with the electronic control unit ES, for example, and is arranged inside the motor vehicle KF or is arranged outside the motor vehicle KF, for example in a backend, and is possibly provided by the vehicle manufacturer.

In a similar manner to the desired current profile V_des, a tolerance profile V_tole is illustrated using two dashed lines which surround the desired current profile V_des. The tolerance profile V_tole corresponds to the desired current profile V_des with the difference that the tolerance profile V_tole is offset by one or more predefined tolerance values with respect to the y axis and the x axis both in the positive direction and in the negative direction. This predefines a tolerance band for the current profile, which tolerance band is relevant to the further course when determining a manipulated state of the electronic control unit ES. For example, discrepancies between the measured temporal current profile and the characteristic desired current profile V_des of 0.1% or 5% are feasible tolerance values for determining a manipulated state of the electronic control unit ES. In addition, the tolerance values to be complied with are generally dependent on the available measuring technology and the component to be measured in the vehicle system of the motor vehicle KF, with the result that, for an electronic control unit ES with a low current requirement for example, a possibly greater tolerance value than for an electronic control unit ES with a higher current requirement is advantageous during a current and/or voltage measurement.

A manipulated current profile V_mani is illustrated with a dotted line and, in this context, corresponds to a measured temporal current profile of the electronic control unit ES which has been manipulated by unauthorized intervention. This temporal current profile is measured, for example, by a current sensor SSS on the electronic control unit ES and is compared in the further course with the desired current profile V_des.

In this context, a check is carried out in order to determine whether the measured temporal current profile of the electronic control unit ES matches the desired current profile V_des, including the predefined tolerance value, or differs therefrom. It is therefore determined whether the measured temporal current profile is within the tolerance band predefined by the tolerance current profile V_tole or whether there are positions which exceed this range. This makes it possible to reliably determine a manipulated state of the electronic control unit ES.

The predefined tolerance value and the associated tolerance current profile V_tole are justified, inter alia, by possible fluctuations of the measurement signal MS from the current sensor SSS or by measurement tolerances of the measuring devices which are always present.

As illustrated in FIG. 1, the measured temporal current profile of the electronic control unit ES differs from the tolerance current profile V_tole at a number of positions, with the result that a manipulated current profile V_mani and therefore a manipulated state of the electronic control unit ES are determined. The manipulated state of the electronic control unit ES is determined, for example, by a management unit VE which is coupled, by signaling, to the current sensor SSS and to the data memory DS. It is possibly arranged inside the motor vehicle KF as a type of superordinate decision-making entity or is alternatively implemented in an external memory, for example a backend.

It is then possible in the further course for the management unit VE to provide control signals in order to thus prevent theft of the motor vehicle KF, for example. These control signals are consequently generated by the management unit VE if a manipulated state of the electronic control unit ES has been determined and are understood as meaning control signals in addition to those which are needed to control the vehicle system during operation of the motor vehicle KF.

These additional control signals include, for example, information signals and deactivation signals in order to indicate the manipulated state determined and to deactivate functions of the electronic control unit ES and of the vehicle system. In this manner, unauthorized intervention is signaled, for example by use of an acoustic and/or optical signal. Such signals are implemented, for example, by activating a horn of the motor vehicle and/or a lighting system. It is also possible to indicate the manipulated state of the electronic control unit ES by transmitting an item of information to the manufacturer and/or the owner of the motor vehicle KF. This is then reported, for example, in the form of an emergency call with the message "possible theft".

In addition, a starting operation of the engine of the motor vehicle KF, which is initiated by inputting departure codes WFC, is prevented, for example. For example, valid departure codes WFC which generally make it possible to operate the motor vehicle KF are deactivated after a manipulated state has been determined and therefore become invalid. This prevents theft of the motor vehicle KF, for example, since, on account of the deactivated departure codes WFC, it is no longer possible to enable the engine of the motor vehicle KF.

Further possibilities are provided by selectively switching off or deactivating the electronic control unit ES or individual functions of the vehicle system by means of the additional control signals which are provided by the management unit VE after a manipulated current profile V_mani has been measured and a manipulated state has been determined. In this manner, the energy supply EV of the motor vehicle KF and/or individual current paths inside the vehicle system of the motor vehicle KF is/are deactivated, for example. Such deactivation of particular components is implemented, for example, by opening a relay inside the vehicle system of the motor vehicle KF.

FIG. 2 illustrates the motor vehicle KF which includes the management unit VE, an energy supply EV and a plurality of electronic control units ES. Like the management unit VE, an electronic control unit ES has a data memory DS which stores departure codes WFC and further vehicle information, for example. Alternatively or additionally, a data memory DS is arranged inside the motor vehicle KF and is coupled to the management unit VE as shown by a dashed line in FIG. 2. In addition, an optional data memory DS is illustrated and is arranged outside the motor vehicle KF, for example in a data cloud or a backend.

The motor vehicle KF also has a communication interface KS which is designed to display or output information signals IS. The communication interface may have, for example, one or more of the communication technologies mentioned at the outset, such as WLAN, etc. It may communicate with corresponding infrastructure components outside the vehicle. In an electric vehicle for example, it may also communicate with an external charging station via a charging cable and may possibly be connected to the Internet via said charging station.

The information signals IS are, for example, in the form of audio or video signals or else in the form of a type of emergency call which is transmitted to the vehicle manufacturer or the owner of the motor vehicle KF, for example with the message "possible theft".

The energy supply EV, the electronic control units ES and the data memories DS and the communication interface KS are coupled, by signaling, to the management unit VE. Current and/or voltage sensors SSS which measure the temporal current and/or voltage profiles of the respective electronic control units ES are arranged between the electronic control units ES and the management unit VE. The measurement signals MS from the current and/or voltage sensors SSS are received by the management unit VE and are compared with the characteristic current and/or voltage profiles of the respective electronic control unit ES which are stored in the data memories DS. If a manipulated state is determined, the management unit VE provides different control signals, for example information signals IS, switch-off signals AS or deactivation signals DAS_1 to DAS_3. The reception of measurement signals MS from the current and/or voltage sensors SSS and the transmission of control signals are indicated by arrows. In FIG. 2, the position of the arrows of the respective measurement signals MS and control signals does not provide any information relating to a possible temporal sequence here.

If a manipulated state has been determined, the management unit VE, for example, provides a deactivation signal DAS_2 such that a relay to the energy supply EV of the motor vehicle KF is consequently opened. In the exemplary embodiment in FIG. 2, this is indicated by an open electrical switch between the management unit VE and the energy supply EV, with the result that a power supply of the vehicle system of the motor vehicle KF is deactivated.

Figure 3:
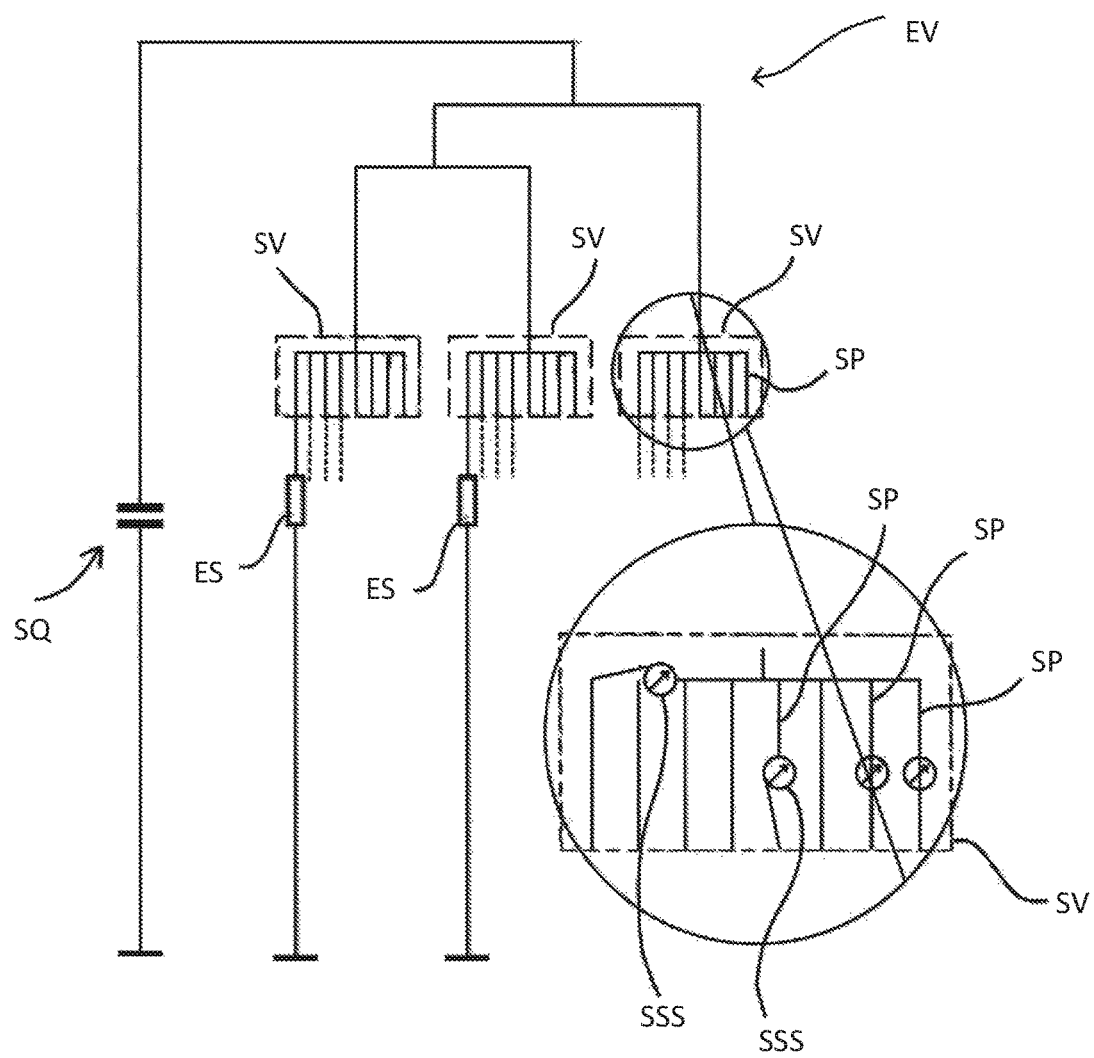
FIG. 3 is a schematic diagram of an exemplary embodiment of an energy supply inside a motor vehicle.

FIG. 3 illustrates an exemplary embodiment of an energy supply EV inside the motor vehicle KF. In this case, the energy supply EV includes a current source SQ which is coupled to a plurality of current distributors SV. In this case, the current distributors SV include a plurality of current paths SP to which various electrical control units ES are coupled. In this exemplary embodiment, three current distributors SV and two electronic control units ES are illustrated by way of example; however, further current distributors SV and further electronic control units ES of the motor vehicle KF are also possible, which is indicated by dotted lines which lead from the current distributors SV. A detailed view in FIG. 3 illustrates an exemplary current distributor SV on an enlarged scale. Current and/or voltage sensors SSS which measure the temporal current and/or voltage profile of one or more electronic control units ES at important points inside the current distributors SV, for example with regard to the security of the motor vehicle KF, are illustrated on different current paths SP. The measurement signals MS from the current and/or voltage sensors SSS are then evaluated and a manipulated state is determined directly inside the respective current distributors SV, for example.

Figure 4:
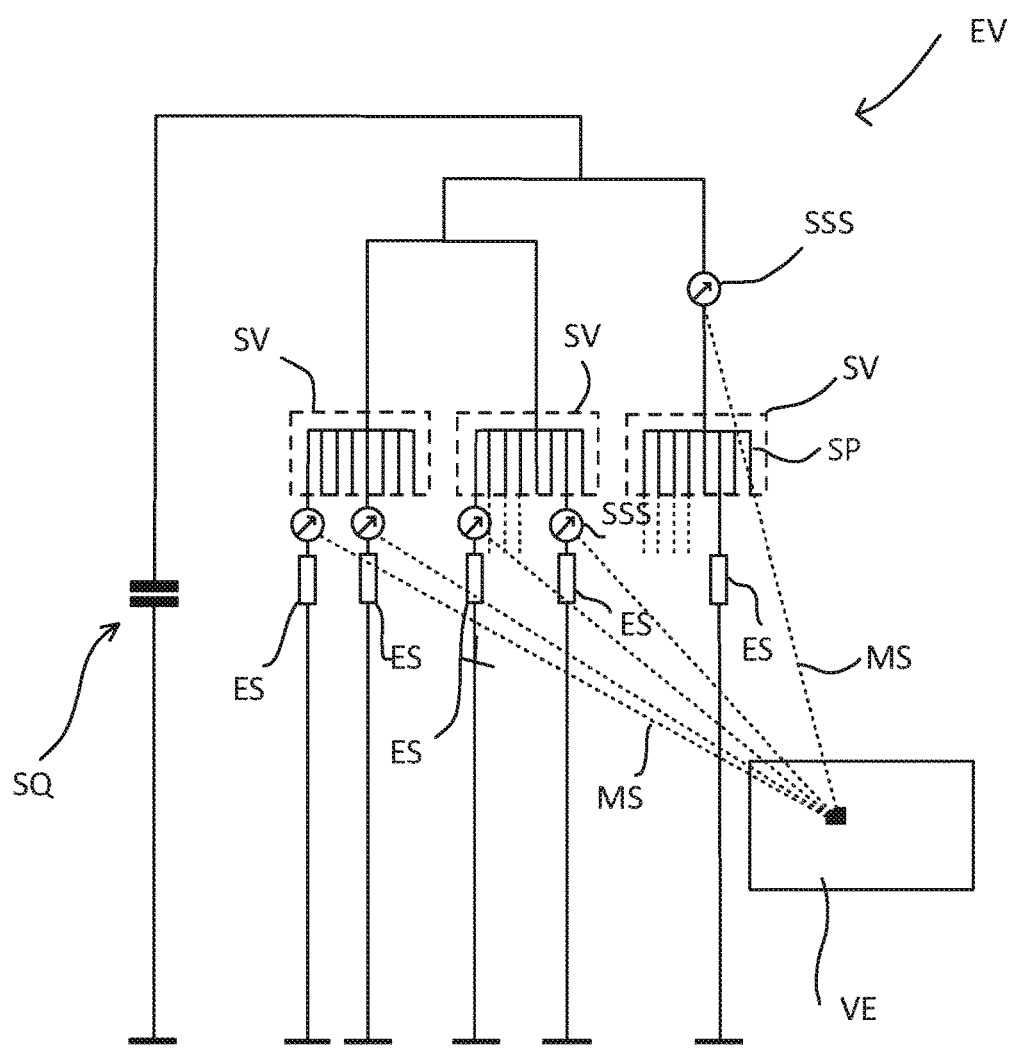
FIG. 4 is a schematic diagram of another exemplary embodiment of an energy supply inside a motor vehicle.

FIG. 4 illustrates another exemplary embodiment of an energy supply EV inside the motor vehicle KF. In contrast to the exemplary embodiment in FIG. 3, the current and/or voltage sensors SSS are arranged outside the three current distributors SV illustrated. The management unit VE which is coupled, by signaling, to the current and/or voltage sensors SSS is also illustrated. This is indicated by the dotted lines which run toward the management unit VE. In this example, the measurement signals MS from the respective current and voltage sensors SSS are evaluated and a manipulated state is determined centrally in the management unit VE by comparing the temporal current and/or voltage profiles with characteristic current and/or voltage profiles. Five exemplary electronic control units ES of the motor vehicle KF are also illustrated in this exemplary embodiment.

FIG. 5 illustrates an exemplary embodiment of a current distributor SV in which a plurality of current paths SP and current and/or voltage sensors SSS are arranged. Three electronic control units ES and a plurality of relays RE in the form of electrically open switches are also illustrated. The dotted lines are used to indicate short circuits of different current paths SP which are carried out in a controlled manner after a manipulated state has been determined. An electrical circuit connected to the electronic control unit ES was thus short-circuited, for example by actuating a relay RE, in order to thus prevent unauthorized use of the electronic control unit ES and unauthorized intervention in the vehicle system of the motor vehicle KF.

In addition, on account of the controlled short circuit, the electronic control unit ES is prevented from being supplied with energy, for example by means of a further current source, for example from outside the motor vehicle KF. Owing to the controlled short circuit, the connection of an external current source is not expedient in this context since this current source is likewise short-circuited when connected to the short-circuited circuit.

LIST OF REFERENCE SYMBOLS

AS Switch-off signal
DAS_1 Deactivation signal for departure codes
DAS_2 Deactivation signal for energy supply
DAS_3 Deactivation signal for current paths
DS Data memory
ES Electronic control unit
EV Energy supply
I Current
IS Information signal
KF Motor vehicle
KS Communication interface
MS Measurement signals
RE Relay
SP Current path
SQ Current source
SSS Current and/or voltage sensor
SV Current distributor
t Time
VE Management unit
V_mani Manipulated current profile
V_des Desired current profile
V_tole Tolerance current profile
WFC Departure codes The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a motor vehicle, the method comprising the acts of:
   receiving measurement signals which include information relating to a temporal current and/or voltage profile of an electronic control unit of the motor vehicle;
   providing vehicle information, which includes information relating to a desired state representative of a characteristic current and/or voltage profile of the electronic control unit;
   determining a discrepancy between the received measurement signals and the vehicle information provided;
   determining a manipulated state of the electronic control unit if the discrepancy determined is greater than a predefined tolerance value;
   wherein the received measurement signals include information relating to an actual energy consumption of the electronic control unit when activated to control a function of the motor vehicle managed by the electronic control unit;
   wherein the vehicle information provided includes information relating to a desired energy consumption of the electronic control unit when activated to control the function of the motor vehicle managed by the electronic control unit; and
   outputting an information signal for activating a horn of the motor vehicle, for activating a lighting system of the motor vehicle, or for sending an emergency call if a manipulated state of the electronic control unit has been determined.

2. A method for operating a motor vehicle, the method comprising the acts of:
   receiving measurement signals, which include information relating to a temporal current and/or voltage profile of an electronic control unit of the motor vehicle;
   providing vehicle information, which includes information relating to a desired state representative of a characteristic current and/or voltage profile of the electronic control unit;
   determining a discrepancy between the received measurement signals and the vehicle information provided;
   determining a manipulated state of the electronic control unit if the discrepancy determined is greater than a predefined tolerance value;
   wherein the received measurement signals include information relating to an actual energy consumption of the electronic control unit when activated to control a function of the motor vehicle managed by the electronic control unit;
   wherein the vehicle information provided includes information relating to a desired energy consumption of the electronic control unit when activated to control the function of the motor vehicle managed by the electronic control unit; and
   preventing a drive unit of the motor vehicle from being started if a manipulated state of the electronic control unit has been determined.

3. A method for operating a motor vehicle, the method comprising the acts of:
   receiving measurement signals, which include information relating to a temporal current and/or voltage profile of an electronic control unit of the motor vehicle;
   providing vehicle information, which includes information relating to a desired state representative of a characteristic current and/or voltage profile of the electronic control unit;
   determining a discrepancy between the received measurement signals and the vehicle information provided;
   determining a manipulated state of the electronic control unit if the discrepancy determined is greater than a predefined tolerance value;
   wherein the received measurement signals include in m relating to an actual energy consumption of the electronic control unit when activated to control a function of the motor vehicle managed by the electronic control unit;

wherein the vehicle information provided includes information relating to a desired energy consumption of the electronic control unit when activated to control the function of the motor vehicle managed by the electronic control unit; and outputting a deactivation signal for deactivating one or more of: at least one departure code for the motor vehicle, an energy supply of the motor vehicle, or a current path inside the motor vehicle if a manipulated state of the electronic control unit has been determined.

4. A method for operating a motor vehicle, the method comprising the acts of:

receiving measurement signals, which include information relating to a temporal current and/or voltage profile of an electronic control unit of the motor vehicle;

providing vehicle information, which includes information relating to a desired state representative of a characteristic current and/or voltage profile of the electronic control unit;

determining a discrepancy between the received measurement signals and the vehicle information provided;

determining a manipulated state of the electronic control unit if the discrepancy determined is greater than a predefined tolerance value;

wherein the received measurement signals include information relating to an actual energy consumption of the electronic control unit when activated to control a function of the motor vehicle managed by the electronic control unit;

wherein the vehicle information provided includes information relating to a desired energy consumption of the electronic control unit when activated to control the function of the motor vehicle managed by the electronic control unit; and outputting a switch-off signal for selectively switching off the electronic control unit of the motor vehicle if a manipulated state of the electronic control unit has been determined.

5. An apparatus for operating a motor vehicle equipped With an electronic control unit, comprising:

at least one current and/or voltage sensor which is coupled, by signaling, to the electronic control unit of the motor vehicle and whose measurement signal is representative of a temporal current and/or voltage profile of the electronic control unit, a data memory which stores vehicle information which includes information relating to a characteristic current and/or voltage profile of the electronic control unit, and a management unit which is coupled, by signaling, to the at least one current and/or voltage sensor and to the data memory and is configured to receive the measurement signals from the at least one current and/or voltage sensor and the vehicle information stored in the data memory in order to determine a manipulated state on the basis of a discrepancy between the measurement signals and the vehicle information, wherein the received measurement signals include information relating to an actual energy consumption of the electronic control unit when activated to control a function of the motor vehicle managed by the electronic control unit, wherein the vehicle information stored includes information relating to a desired energy consumption of the electronic control unit when activated to control the function of the motor vehicle managed by the electronic control unit, and wherein the management unit is further configured to output an information signal for activating a horn of the motor vehicle, for activating a lighting system of the motor vehicle, or for sending an emergency call if a manipulated state of the electronic control unit is determined.

6. An apparatus for operating a motor vehicle equipped with an electronic control unit, comprising;

at least one current and/or voltage sensor which is coupled, by signaling, to the electronic control unit of the motor vehicle and whose measurement signal is representative of a temporal current and/or voltage profile of the electronic control unit, a data memory which stores vehicle information which includes information relating to a characteristic current and/or voltage profile of the electronic control unit, and a management unit which is coupled, by signaling, to the at least one current and/or voltage sensor and. to the data memory and is configured to receive the measurement signals from the at least one current and/or voltage sensor and the vehicle information stored in the data memory in order to determine a manipulated. state on the basis of a discrepancy between the measurement signals and the vehicle information, wherein the received measurement signals include information relating to an actual energy consumption of the electronic control unit when activated to control a function of the motor vehicle managed by the electronic control unit, wherein the vehicle information stored includes information relating to a desired energy consumption of the electronic control unit when activated to control the function of the motor vehicle managed by the electronic control unit, and wherein the management unit is further configured to output a signal to prevent a drive unit of the motor vehicle from being started if a manipulated state of the electronic control unit has been determined.

7. An apparatus for operating a motor vehicle equipped with an electronic control unit, comprising:

at least one current and/or voltage sensor which is coupled by signaling, to the electronic control unit of the motor vehicle and whose measurement signal is representative of a temporal current and/or voltage profile of the electronic control unit, a data memory which stores vehicle information which includes information relating to a characteristic current and/or voltage profile of the electronic control unit, and a management unit which is coupled, by signaling, to the at least one current and/or voltage sensor and to the data memory and is configured to receive the measurement signals from the at least one current and/or voltage sensor and the vehicle information stored in the data memory in order to determine a manipulated state on the basis of a discrepancy between the measurement signals and the vehicle information, wherein the received measurement signals include information relating to an actual energy consumption of the electronic control unit when activated to control a function of the motor vehicle managed by the electronic control unit, wherein the vehicle information stored includes information relating to a desired energy consumption of the electronic control unit when activated to control the function of the motor vehicle managed by the electronic control unit, and wherein the management unit is further configured to output a deactivation signal for deactivating one or more of: a departure code for the motor vehicle, an energy supply of the motor vehicle, or a current path, inside the motor vehicle, if a manipulated state of the electronic control unit has been determined.

8. An apparatus for operating a motor vehicle equipped with an electronic control unit, comprising:
- at least one current and/or voltage sensor which is coupled, by signaling, to the electronic control unit of the motor vehicle and whose measurement signal is representative of a temporal current and/or voltage profile of the electronic control unit,
- a data memory which stores vehicle information which includes information relating to a characteristic current and/or voltage profile of the electronic control unit, and
- a management unit which is coupled, by signaling, to the at least one current and/or voltage sensor and to the data memory and is configured to receive the measurement signals from the at least one current and/or voltage sensor and the vehicle information stored in the data memory in order to determine a manipulated state on the basis of a discrepancy between the measurement signals and the vehicle information, wherein the received measurement signals include information relating to an actual energy consumption of the electronic control unit when activated to control a function of the motor vehicle managed by the electronic control unit, wherein the vehicle information stored includes information relating to a desired energy consumption of the electronic control unit when activated to control the function of the motor vehicle managed by the electronic control unit, and wherein the management unit is further configured to output a switch-off signal that selectively switches off the electronic control unit of the motor vehicle if a manipulated state of the electronic control unit has been determined.

* * * * *